US006912395B2

United States Patent
Benes et al.

(10) Patent No.: US 6,912,395 B2
(45) Date of Patent: Jun. 28, 2005

(54) NETWORK AND METHOD FOR MONITORING LOCATION CAPABILITIES OF A MOBILE STATION

(75) Inventors: Stanley J. Benes, Round Lake Beach, IL (US); William P. Declerck, Palatine, IL (US); Gerald J. Gutowski, Palatine, IL (US); Lawrence Downing, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 255 days.

(21) Appl. No.: 09/962,426

(22) Filed: Sep. 25, 2001

(65) Prior Publication Data

US 2003/0060197 A1 Mar. 27, 2003

(51) Int. Cl.[7] .......................... H04Q 7/20; G01C 21/26; G01S 3/02
(52) U.S. Cl. ............................... 455/456.1; 455/456.2; 455/456.5; 455/456.6; 455/432.3; 701/214; 342/450
(58) Field of Search ..................... 455/456.1–456.6, 455/457, 414.1–414.4, 432.1–435.1, 424–425, 423; 701/213, 214; 342/450, 457; 714/39, 47, 37

(56) References Cited

U.S. PATENT DOCUMENTS

| 5,724,660 | A | * | 3/1998 | Kauser et al. | ............... 455/456 |
| 5,960,345 | A | * | 9/1999 | Laatu | ....................... 455/435.1 |
| 6,002,936 | A | * | 12/1999 | Roel-Ng et al. | ............ 455/456 |
| 6,295,454 | B1 | * | 9/2001 | Havinis et al. | ............. 455/456 |
| 6,389,291 | B1 | * | 5/2002 | Pande et al. | |
| 6,393,294 | B1 | * | 5/2002 | Perez-Breva et al. | .... 455/456.5 |
| 6,487,413 | B1 | * | 11/2002 | Suojasto | ...................... 455/446 |
| 6,542,813 | B1 | * | 4/2003 | Kovacs | ....................... 701/208 |

FOREIGN PATENT DOCUMENTS

| WO | WO 00/19643 | 4/2000 |
| WO | WO 00/26687 | 5/2000 |
| WO | WO 00/28724 | 5/2000 |
| WO | WO 00/49738 | 8/2000 |
| WO | WO 01/10101 A1 | 2/2001 |

* cited by examiner

*Primary Examiner*—Duc M. Nguyen
(74) *Attorney, Agent, or Firm*—Hisashi D. Watanabe

(57) ABSTRACT

The present invention is a communication network (100) and method for monitoring location capabilities of mobile stations (102) in a database (120) of a communication network. Initially, the network receives an identification number from a mobile station (102). If the database (120) does not include a location capability corresponding to the identification number, then a processor (118) requests the location capability from the mobile station (102) and stores the requested location capability in the database (120). The location capability includes one or more of the following capabilities: an autonomous mode capability, an assisted mode capability and a legacy mode capability. To retrieve an entry from the database (120), the network reads the location capability corresponding to the identification number from the database (120). The network then assembles an assistance message based on the location capability of the mobile station (102) and transmits the assistance message to the mobile station (102).

18 Claims, 3 Drawing Sheets

NETWORK AND METHOD FOR MONITORING LOCATION CAPABILITIES OF A MOBILE STATION

FIELD OF THE INVENTION

The present invention generally relates to wireless communication system that provide location-based services to a user of a mobile station. In particular, the present invention relates to wireless communication systems that provide location-based services in an efficient and timely manner.

BACKGROUND OF THE INVENTION

Users of mobile stations, such as handheld portable units, laptop units, etc., and service providers of wireless communication networks commonly use location-based services. By knowing the current location of the mobile station (and, thus, the user), the service provider may tailor services provided to the user. For example, the service provider may determine a billing rate for the user based on the location of the mobile station when the call is made. A service provider would typically charge less for a call made from within a home coverage area than a call made from outside of the home coverage area.

Current location-based services rely on a particular sequence of messages prescribed by existing wireless communication standards to determine a location of a mobile station. For example, for the IS-801 standard, the mobile station originates a call and, as a result, a wireless communication network receives a location request. The network then requests information about the mobile station's location capabilities from the mobile station. Next, the mobile station responds to the network by providing its location capabilities. Finally, the network is able to provide location-based assistance based on the mobile station's response. The IS-801 standard would require communication between the mobile station and the network regarding the mobile station's location capabilities before location-based assistance may be provided to the mobile station, thus creating a time latency. Also, the communication regarding the mobile station's location capabilities would consume valuable battery power at the mobile station and computation power of the network.

For example, many emergency systems for mobile stations and wireless communication networks, such as the E911 emergency system, rely on location-based services. The E911 emergency system utilizes the current location of a mobile station to locate a caller in need of emergency assistance. Based on the location of the mobile station, the wireless communication network is able to contact and/or dispatch emergency service personnel nearest to that location. In an emergency situation, it is critical to determine the caller's location, and other pertinent details, as quickly as possible. To expeditiously locate a mobile station, a wireless communication network must know the capabilities of the mobile station so the proper location-based assistance can be provided.

Accordingly, there is a need for a mobile station and wireless communication network having location-based services with minimal time latency, reduced power consumption, reduced computational penalties, and reduced over-the-air message traffic by managing location information about mobile stations within the network. In addition, there is further need for a wireless communication network that monitors and collects detailed information about the performance of its location-based services.

SUMMARY OF THE INVENTION

The present invention is an adaptive method for storing location capabilities of mobile stations in a database of a communication network. An identification number is received from a mobile station, and an entry is created in the database corresponding to the identification number. The location capability is then received from the mobile station, and the location capability is stored in the database. Next, an assistance message based on the location capability of the mobile station is assembled. The assistance message includes location calculation parameters of the mobile station. The assistance message is thereafter transmitted to the mobile station.

The present invention is also an adaptive method for retrieving location capabilities of mobile stations from a database of the communication network. An identification number is received from the mobile station, and a location capability corresponding to the identification number is read from the database. Next, an assistance message based on the location capability of the mobile station is assembled. The assistance message includes location calculation parameters of the mobile station. The assistance message is thereafter transmitted to the mobile station.

The present invention is further a non-adaptive method for retrieving location capabilities of mobile stations from a database of the communication network. An identification number is retrieved from the mobile station, and a category and a sub-category of the category are identified from the identification number. A location capability corresponding to the identification number is then retrieved from the database based on the category and the sub-category. Next, an assistance message based on the location capability of the mobile station is assembled. The assistance message includes location calculation parameters of the mobile station. The assistance message is thereafter transmitted to the mobile station.

The present invention is still further a communication network of a wireless communication system for monitoring location capabilities of mobile stations. The communication network comprises a database and a processor coupled to the database. The database stores location capabilities of a mobile station based on an identification number of the mobile station. The location capability includes one or more of the following capabilities: an autonomous mode capability, an assisted mode capability and a legacy mode capability. The processor sends an assistance message based on the location capability to the mobile station. The assistance message includes location calculation parameters of the mobile station. If the database does not include the location capability, then the processor requests the location capability from the mobile station and stores the mobile location capability in the database.

DETAILED DESCRIPTION OF THE PREFERRED EMBODIMENTS

The present invention utilizes previously acquired or a priori information about mobile stations, such as their location capabilities. One embodiment is an adaptive method and communication network for monitoring location capabilities of mobile stations. The communication network includes a database that is capable of storing information about each mobile station communicating with the communication network. Once the communication network receives information about a mobile station, the communication network stores the information in its database. Anytime thereafter, the communication network may retrieve the information from the database without disturbing the mobile station or tying-up the communication lines between the communication network and the mobile station. Accordingly, the adaptive method and communication network of the present invention minimizes time latency, reduces power consumption of the mobile station, reduces computational penalties subjected to the communication network, and reduces over-the-air message traffic.

Another embodiment of the present invention is a non-adaptive method and communication network for monitoring location capabilities of mobile stations in a database of a communication network. The database of this non-adaptive method and communication network is not modified automatically during operation, but can be modified or updated by a system operator of a service provider. The database includes a significant amount of information. To easily sort through and access such information, the information is organized into general categories in which each general category is organized into smaller sub-categories. Accordingly, the non-adaptive method and communication network of the present invention facilitates management of a large database of information about mobile stations.

Figure 1:
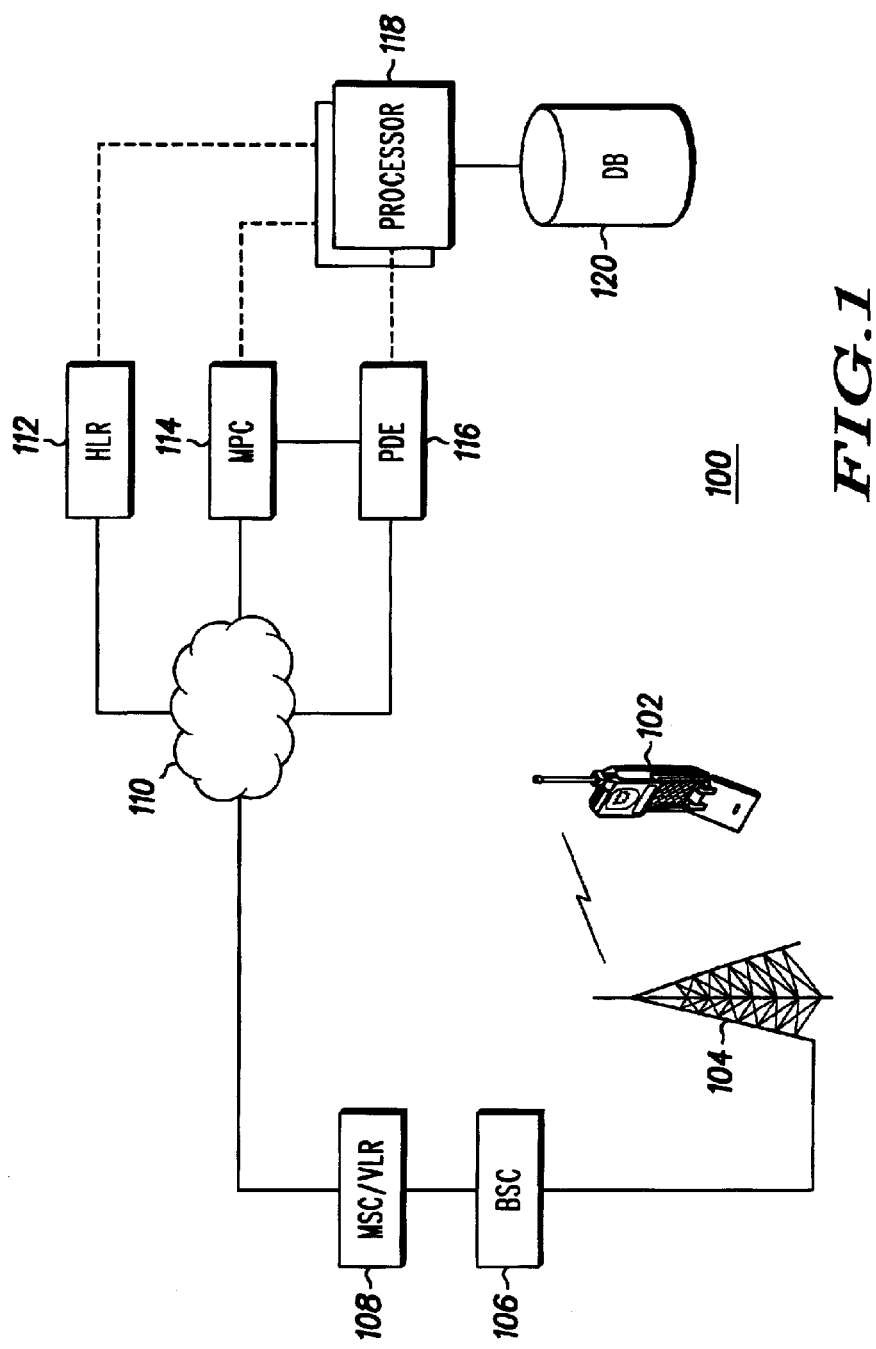
FIG. 1 is a block diagram representing a wireless communication system that may be adapted to operate in accordance with the preferred embodiments of the present invention.

Referring to FIG. 1, there is provided a wireless communication system 100 that may be adapted to operate in accordance with the preferred embodiments of the present invention. The wireless communication system 100 includes a plurality of mobile stations, such as mobile station 102 shown in FIG. 1. Each mobile station 102 has an assigned identification number, such as an Electronic Serial Number ("ESN") or an International Subscriber Mobile Identity ("IMSI"). In addition, each mobile station 102 may use any type of position estimation system to determine its location, such as a terrestrial positioning system, a celestial positioning system, or a combination of these systems. Terrestrial positioning systems utilize various techniques including, but not limited to, a forward link trilateration ("FLT") technique, an advanced forward link trilateration ("AFLT") technique, an amplitude difference, angle of arrival ("AD-AOA") technique, or an enhanced observed time difference ("EOTD") technique. A global positioning system ("GPS") is an example of a celestial positioning system.

In addition to the mobile station 102, the wireless communication system 100 includes a communication network having one or more of each of the following equipment: a base transceiver station ("BTS") 104, a base station controller ("BSC") 106, a mobile switching center/visitor location register ("MSC/VLR") 108, and an interoperability center 110. The BTS 104 is a wireless voice and/or data link, typically a radio tower, connecting the mobile station 102 to the remainder of the communication network. The BSC 106 is a high capacity switch that provides control functions such as handover, cell configuration data, and control of power levels in the BTS 104. The MSC/VLR 108 routes calls to and from the mobile station 102 as well as tracking location information of the mobile station. The MSC part of the MSC/VLR 108 controls calls to and from other telephone and data systems, and performs functions such as toll ticketing, network interfacing, and common channel signaling. The VLR part of the MSC/VLR 108 stores temporary information about the location of the mobile station 102 within a given area served by the MSC part of the MSC/VLR. The interoperability center 110 provides proper conversion of voice and/or data signals of the mobile station 102 to and from another communication protocol, if necessary. Each of the above elements of the wireless infrastructure is commercially available from Motorola, Inc. of Schaumburg, Ill.

The communication network of the wireless communication system 100 may also include one or more of the following equipment: a Home Location Register ("HLR") 112, a Mobile Position Center ("MPC") 114, and a Position Determining Entity ("PDE") 116. The HLR 112 stores and manages subscriber information relevant to provisioning of telecommunication services independently of the actual location of the subscriber in the system, thus, allowing for roaming between telecommunication systems. The MPC 114 (a.k.a. GMLC) is a mobile location center positioned, like a controller or gateway, between an Internet and PDE's 116. The PDE 116 (a.k.a. SMLC) provides location calculation parameters to position estimation systems; analyzes pseudo ranges from celestial and terrestrial equipment; and returns latitude, longitude and identification information to the MPC 114. The location calculation parameters are used by the mobile station 102 to determine its location and include, but are not limited to, information about visible satellites, visible BTS's, signal phase, signal frequencies, etc.

The communication network of the wireless communication system 100 further includes a processor 118 and a database 120 coupled to the processor. The database 120 may store a location capability of each mobile station 102 based on an identification number of the mobile station. The possible location capabilities of the mobile station 102 include an autonomous mode capability, an assisted mode capability and a legacy mode capability. The database 120 may also store an operation mode of the mobile station 102 based on the identification number in which the operation mode is an autonomous mode, an assisted mode or a legacy mode. For the autonomous mode or capability, the mobile station 102 determines its location without assistance from the communication network. For the assisted mode or capability, the mobile station 102 determines its location with the assistance of certain information received from the communication network. For the legacy mode or capability, the wireless network determines the mobile station's location.

In addition, the database 120 has the capacity to store statistical information about the mobile station 102. Examples of such statistical information include, but are not limited to, penetration of various location technologies, accuracy of deployed technologies, verification of meeting minimum operational requirements, and discrimination of specific device information, such as AGPS capable phones versus legacy phones. Information about the accuracy of deployed technologies includes absolute accuracy in metric units, or instantaneous and/or cumulative location confidence data obtained from deployed mobile stations.

For example, the database 120 may store accuracy ratings for location estimation systems such as circular error probability ("CEP") and spherical error probability ("SEP"). The CEP defines the radius of a circle that represents a 50 percent probability of a position lying in that circle. The SEP probability is similar except that it represents three-dimensional accuracy because it defines the radius of a sphere. For the preferred embodiments, the database 120 stores accuracy ratings for GPS, such as an instantaneous circular error probability and a cumulative circular error probability.

The established database 120 can be analyzed to extract mobile station population information that could be helpful to a service provider. For example, the database 120 could provide the service provider with information about the number of mobile stations 102 in a wireless communication system and the type of location technology used by each mobile station. The database 120 could also provide information demonstrating compliance by the service provider with FCC mandates and the overall penetration of GPS-capable mobiles in the system.

The processor 118 may be coupled to, or integrated within, any part of the communication network, such as the HLR 112, the MPC 114 and the PDE 116. Also, the processor 118 may send an assistance message based on the location capability of the mobile station 102 to the mobile station. For the preferred embodiment, the assistance message includes a location of the mobile station 102. In addition, the processor 118 may request the location capability of the mobile station 102 from the mobile station and store the requested location capability in the database 120 if the database does not include the location capability.

As stated above, the possible location capabilities of the mobile station 102 include an assisted mode capability, a legacy mode capability, and an autonomous mode capability. A mobile station 102 having the assisted mode capability or legacy mode capability would require assistance from the communication network. The communication network would need to know the mobile station's location capability for the assisted and legacy modes and, thus, the mobile station 102 that uses the assisted mode and/or the legacy mode would benefit significantly from the present invention. A mobile station 102 having the autonomous mode capability will determine its location without assistance from the communication network, but would still benefit from the present invention by improved performance and/or reduced bandwidth requirements.

Figure 2:
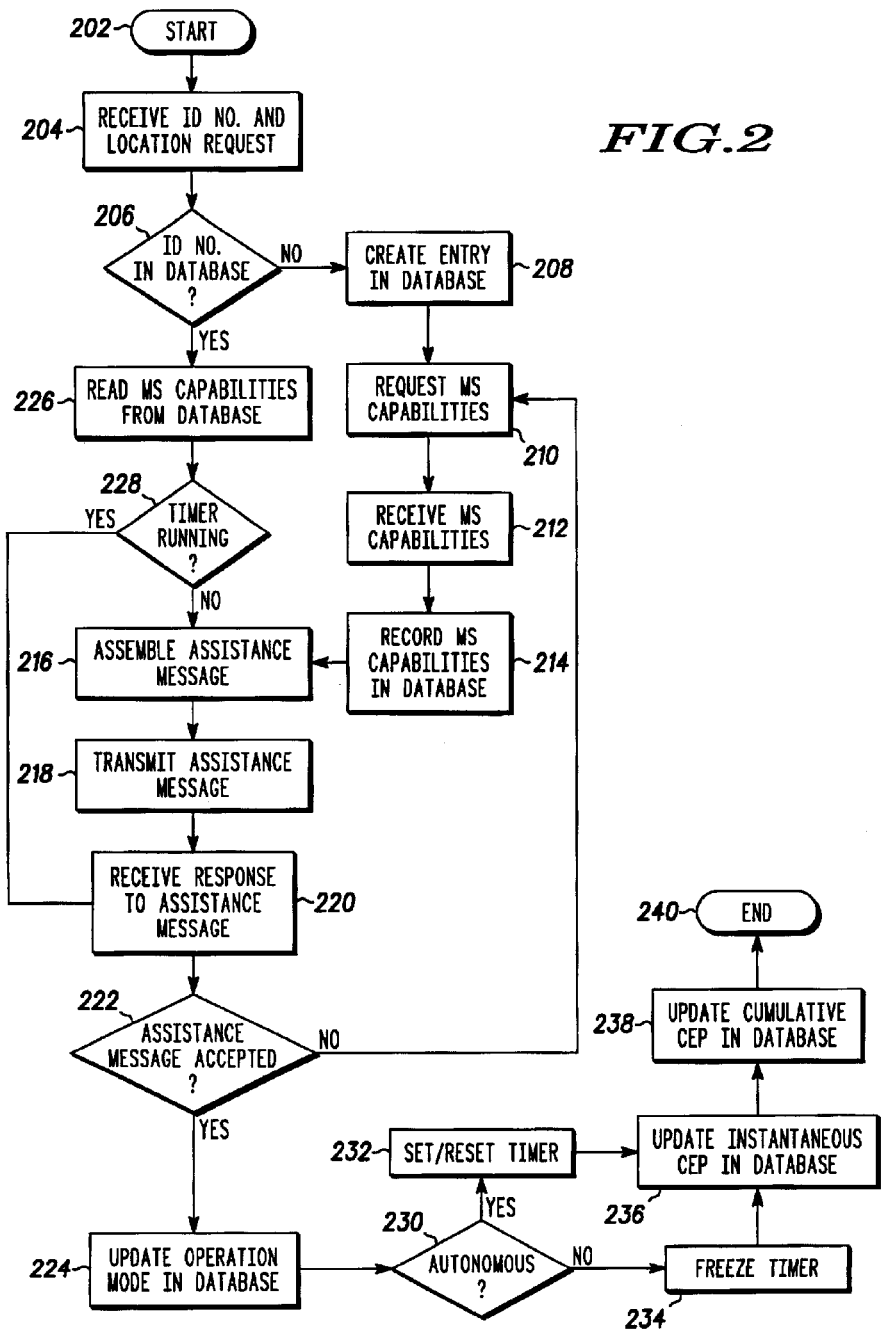
FIG. 2 is a flow diagram representing an adaptive method for determining and storing location capabilities of a mobile station.

Referring to FIG. 2, there is provided a flow chart representing an adaptive process for monitoring information about mobile stations, particularly location capabilities and the like, in accordance with a first preferred embodiment of the present invention. For the first preferred embodiment, the processor 118 and database 120 reside in the PDE 116. The process starts at step 202 and, then, each mobile station 102 transmits its identification number to a communication network as soon as a call is initiated at step 204. If the call requires location information, the MSC/VLR 108 sends the location request and forwards the identification number to the MPC 114 via a messaging protocol. The MPC 114 passes the identification number to the PDE 116.

The processor 118 residing in the PDE 116 monitors and passes the incoming identification number to the database 120 at step 206. If the identification number is new, i.e., not in the database, then the processor 118 creates an entry for the identification number in a sorted list at step 208, and instructs the PDE 116 to request the location capabilities of the mobile station 102 at step 210. When the processor 118 receives a response from the mobile station 102 at step 212, the processor 118 determines the location capabilities from the response and records the location capabilities in the database 120 at step 214. Next, the processor 118 assembles an assistance message at step 216. In particular, the processor 118 marks assistance information associated with that identification number as aid information required by the user of the mobile station 102. The processor 118 transmits the assistance message to the mobile station 102 at step 218 and, then, receives a response to the assistance message at step 220. If the mobile station 102 does not accept the response to the assistance message at step 222, then the processor 118 must repeat the steps of obtaining the MS capabilities and assembling/transmitting the assistance message, i.e., steps 210 through 220. If the mobile station 102 accepts the response to the assistance message at step 222, then the processor 118 updates an operation mode field of the database 120 at step 224.

After creating an entry for a particular identification number in the database 120, the processor 118 may read the location capabilities of the corresponding mobile station 102 from the database any time thereafter at step 226, thus avoiding the task of requesting this information from the mobile station. Specifically, the process starts at step 202 and, then, each mobile station 102 transmits its identification number to a communication network at step 204. The processor 118 monitors and passes the incoming identification number to the database 120 at step 206. If the identification number is not new, i.e., is in the database, then the processor 118 reads the location capabilities of the mobile station 102 from the database at step 226. Thereafter, similar to the entry creating process described above, the processor 118 assembles an assistance message at step 216, transmits the assistance message to the mobile station 102 at step 218, and receives a response to the assistance message at step 220. If the response to the assistance message is not accepted by the mobile station 102 at step 222, then the processor 118 may repeat either (1) steps 210 through 220 to request the location capabilities again from the mobile station 102, or (2) steps 226, 216, 218 and 220 to re-read the location capabilities from the database 120. For the preferred embodiment shown in FIG. 3, the processor 118 repeats steps 210 through 220.

The processor 118 determines whether the mobile station 102 is operating in an assisted, autonomous or legacy mode. Specifically, a mobile station 102 in an autonomous mode does not require an assistance message. Therefore, at step 228, the processor 118 determines whether the operation mode of the mobile station 102 is an autonomous mode. If a timer is running, then the mobile station 102 is operating in an autonomous mode at step 228. In the preferred embodiment, the timer is a function integrated within the processor 118. The processor 118 then bypasses the steps of assembling and transmitting the assistance message, i.e., steps 216 and 218, and expects to receive a message indicating the mobile station's location at step 220.

The timer described above is controlled at steps 230 through 234 of FIG. 2. At step 230, the processor 118 determines whether the mobile station 102 is operating in an assisted, autonomous or legacy mode. If the mobile station 102 is operating in an autonomous mode, then the timer is set/reset at step 232 so that it is running. If the mobile station 102 is operating in an assisted mode or a legacy mode, then the timer is frozen at step 234 so that it is not running.

For the preferred embodiments, the timer resets after a predetermined time period so that the processor 118 will assemble and transmit the assistance message at steps 216 and 218. Certain mobile stations 102 may switch between an autonomous mode and another mode, such as an assisted mode, dependent upon various conditions. Thus, processor 118 uses the timer to periodically switch back to assembling and transmitting the assistance message for those situations in which the mobile station 102 is no longer operating in the autonomous mode.

As stated above, the database 120 has the capacity to store statistical information about the mobile station 102, such as accuracy ratings for location estimation systems such as circular error probability ("CEP") and spherical error probability ("SEP"). For the preferred embodiments, the database 120 stores accuracy ratings for GPS, such as an instantaneous circular error probability and a cumulative circular error probability. In particular, the processor 118 establishes fields in the database 120 for instantaneous and cumulative Circular Error Probability ("CEP") for the mobile stations 102. At the end of the location attempt, the processor 118 records the instantaneous CEP in the database 120 at step 236 and updates the cumulative CEP in the database at step 238. Thereafter, the process terminates at step 240.

As more users use the network and method described herein, the information content of the database 120 will build so that the requests for location capabilities will only be necessary for servicing new mobile stations 102, including new roamers, in the wireless communication system. Additionally, the present invention will reduce the message traffic and support required for assistance mode or legacy mode mobile stations making repeated location requests.

Figure 3:
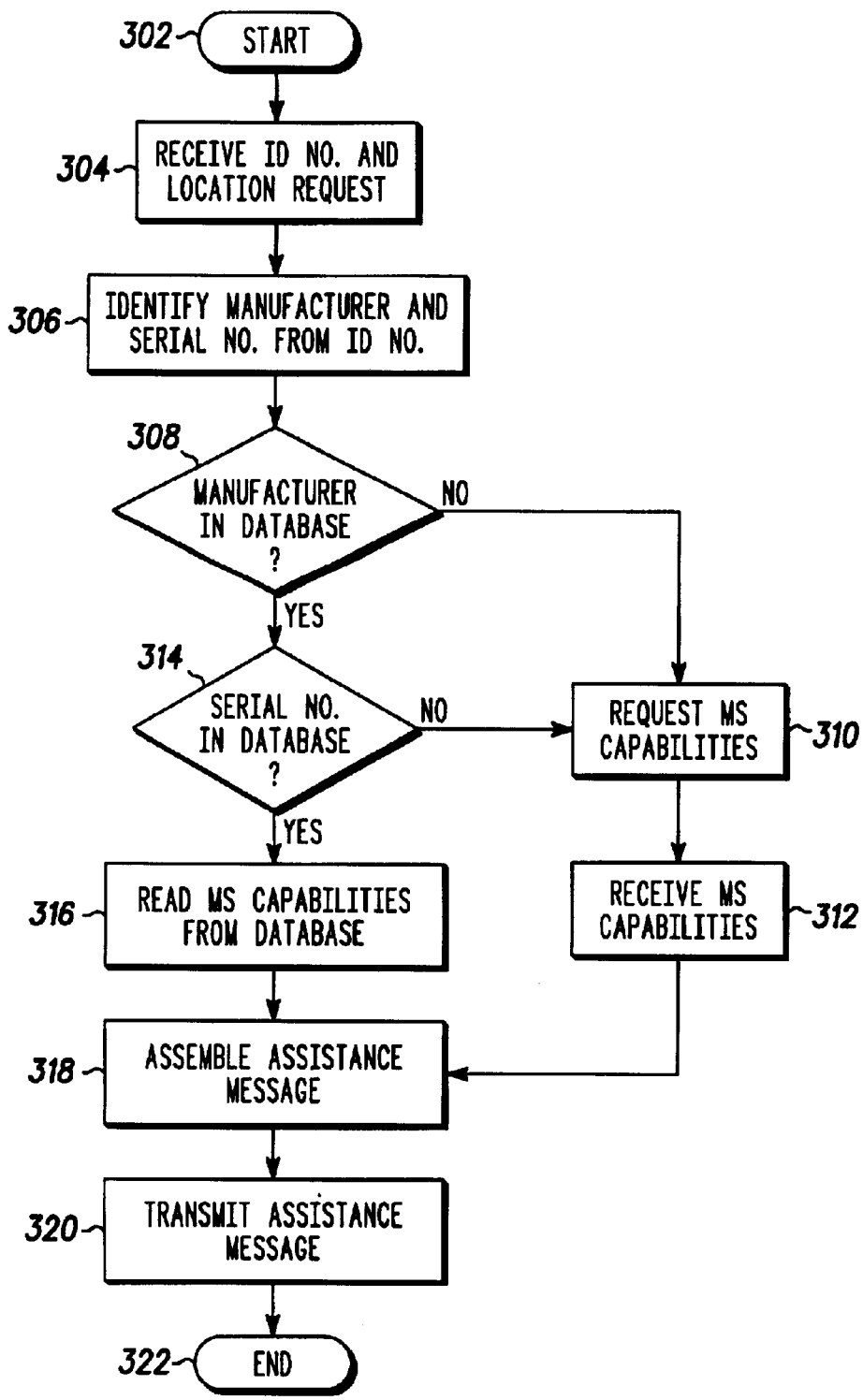
FIG. 3 is a flow diagram representing a non-adaptive method for determining and storing location capabilities of a mobile station.

Referring to FIG. 3, there is provided a flow chart representing a non-adaptive process for monitoring information about mobile stations, particularly location capabilities and the like, in accordance with a second preferred embodiment of the present invention. Similar to the first preferred embodiment, the processor 118 and database 120 reside in the PDE 116 for the second preferred embodiment. Also, the non-adaptive process of the second preferred embodiment uses a simple look-up table based on a category, such as manufacturers, and a sub-category, such as serial numbers.

The process starts at step 302 and, then, each mobile station 102 transmits its identification number to a communication network as soon as a call is initiated at step 304. When the mobile station's identification number is passed to the PDE 116, the processor 118 identifies the manufacturer of the mobile station 102 from the manufacturer bit field of the identification number as well as a serial number of the mobile station from a serial number bit field of the identification number at step 306. The processor 118 then checks the database 120 to see if information about location capable mobile stations from the identified manufacturer is available at step 308. If information is not available, the processor 118 requests a location capability from the mobile station 102 and receives the location capability from the mobile station at steps 310 and 312, respectively. If the manufacturer is included in the database 120, the processor 118 queries the database 120 to see if there is a location capability for the serial number associated with the identification number at step 314. If information is not available, the processor 118 requests a location capability from the mobile station and receives the location capability from the mobile station at steps 310 and 312, respectively. If the information is available, the processor 118 reads the location capabilities of the mobile station 102 from the database 120 at step 316. Next, the processor 118 assembles an assistance message at step 318, and transmits the assistance message to the mobile station 102 at step 320. Thereafter, the process terminates at step 322.

The database 120 of the preferred embodiments includes mobile information to improve message traffic and minimizes time latency for determining the location of any mobile station 102 operating in an assisted mode or legacy mode. The database 120 may also include priority identification numbers corresponding to users who require or desire additional assistance in an emergency situation. For example, one priority identification number entry in the database 120 might identify a user with a serious heart condition. If an emergency call arrives from that identification number, the appropriate response personnel can be alerted to a possible cardiac event without receiving such information from the call originator.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for monitoring location capabilities of mobile stations using a communication network, the communication network including a database for storing the location capabilities, the method comprising the steps of:
   receiving an identification number from a mobile station;
   creating an entry in the database corresponding to the identification number;
   receiving a location capability from the mobile station;
   storing the location capability in the database;
   assembling an assistance message based on the location capability of the mobile station, the assistance message including location calculation parameters of the mobile station;
   transmitting the assistance message to the mobile station; and
   updating the database with statistical information about the mobile station the statistical information including at least one of an instantaneous circular error probability and a cumulative circular error probability in the database.

2. The method of claim 1, wherein the location capability is one of an autonomous mode capability, an assisted mode capability and a legacy mode capability.

3. The method of claim 1, wherein the step of receiving an identification number includes the step of receiving a location request.

4. The method of claim 1, further comprising the step of requesting the location capability from the mobile station before receiving the location capability from the mobile station.

5. The method of claim 1, further comprising the steps of:
   receiving a response to the assistance message after transmitting the assistance message to the mobile station; and
   updating an operation mode of the mobile station in the database, the operation mode being one of an autonomous mode, an assisted mode and a legacy mode.

6. The method of claim 1, further comprising the steps of:
   determining whether the mobile station is in an autonomous mode; and
   bypassing the steps of assembling the assistance message and transmitting the assistance message if the mobile station is in the autonomous mode.

7. A method for monitoring location capabilities of mobile stations using a communication network, the communication network including a database for storing the location capabilities, the method comprising the steps of:
   receiving an identification number from a mobile station;
   reading a location capability corresponding to the identification number from the database;

assembling an assistance message based on the location capability of the mobile station, the assistance message including location calculation parameters of the mobile station;

transmitting the assistance message to the mobile station; and updating the database with statistical information about the mobile station, the statistical information including at least one of an instantaneous circular error probability and a cumulative circular error probability in the database.

8. The method of claim 7, wherein the location capability is one of an autonomous mode capability, an assisted mode capability and a legacy mode capability.

9. The method of claim 7, wherein the step of receiving an identification number includes the step of receiving a location request.

10. The method of claim 7, further comprising the step of requesting the location capability from the mobile station before receiving the location capability from the mobile station.

11. The method of claim 7, further comprising the steps of:

receiving a response to the assistance message after transmitting the assistance message to the mobile station; and updating an operation mode of the mobile station in the database, the operation mode being one of an autonomous mode, an assisted mode and a legacy mode.

12. The method of claim 7, further comprising the steps of:

determining whether the mobile station is in an autonomous mode; and bypassing the steps of assembling the assistance message and transmitting the assistance message if the mobile station is in the autonomous mode.

13. A method for monitoring location capabilities of mobile stations using a communication network, the communication network including a database for storing the location capabilities, the method comprising the steps of:

receiving an identification number from a mobile station;

identifying a category and a sub-category from the identification number;

locating a location capability corresponding to the identification number from the database based on the category and the sub-category;

assembling an assistance message based on the location capability of the mobile station, the assistance message including location calculation parameters of the mobile station;

transmitting the assistance message to the mobile station; and updating the database with statistical information about the mobile station the statistical information including at least one of an instantaneous circular error probability and a cumulative circular error probability in the database.

14. The method of claim 13, wherein the category includes manufacturers of mobile stations and the sub-category includes serial numbers of mobile stations.

15. The method of claim 13, wherein the location capability is one of an autonomous mode capability, an assisted mode capability and a legacy mode capability.

16. A communication network of a wireless communication system for monitoring location capabilities of mobile stations comprising:

a database being capable of storing a location capability of a mobile station based on an identification number of the mobile station and statistical information about the mobile station including at least one of an instantaneous circular error probability and a cumulative circular error probability, the location capability including at least one of an autonomous mode capability, an assisted mode capability and a legacy mode capability, and a processor, coupled to the database, to send an assistance message based on the location capability to the mobile station, the assistance message including a location of the mobile station, wherein the processor requests the location capability from the mobile station and stores the requested location capability in the database if the database does not include the location capability.

17. The communication network of claim 16, wherein the database stores an operation mode of the mobile station based on the identification number, the operation mode being one of an autonomous mode, an assisted mode and a legacy mode.

18. The communication network of claim 16, wherein the processor is located in one of a Position Determining Entity ("PDE"), a Home Location Register ("HLR"), and a Mobile Position Center ("MPC").

* * * * *